(12) United States Patent
Miyasaka et al.

(10) Patent No.: US 6,474,679 B2
(45) Date of Patent: Nov. 5, 2002

(54) VEHICLE AIR BAG SYSTEM

(75) Inventors: Hiroyuki Miyasaka, Yokohama (JP); Tetsuo Maki, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/891,257

(22) Filed: Jun. 27, 2001

(65) Prior Publication Data

US 2002/0014761 A1 Feb. 7, 2002

(30) Foreign Application Priority Data

Jul. 27, 2000 (JP) ........................................ 2000-227816

(51) Int. Cl.[7] .............................................. B60R 21/34
(52) U.S. Cl. .................... 280/730.1; 280/734; 180/274; 296/189
(58) Field of Search ............................. 280/728.1, 734, 280/748, 751, 752; 180/274, 271; 296/189; B60R 21/34

(56) References Cited

U.S. PATENT DOCUMENTS

| 4,249,632 | A | * | 2/1981 | Lucchini et al. ............. 180/274 |
| 4,753,475 | A | * | 6/1988 | Mochida .................. 180/69.21 |
| 5,316,337 | A | * | 5/1994 | Yamaji et al. ............. 280/728.1 |
| 5,794,974 | A | * | 8/1998 | Niederman et al. ........ 280/728.1 |
| 6,182,782 | B1 | * | 2/2001 | Matsuura et al. ............ 180/274 |
| 6,332,115 | B1 | * | 12/2001 | Nobusawa et al. .......... 180/274 |

FOREIGN PATENT DOCUMENTS

| DE | 19745873 A1 | * | 4/1999 | ........... B60R/21/34 |
| DE | 19803165 A1 | * | 7/1999 | ........... B60R/21/34 |
| DE | 2354797 A | * | 4/2001 | ........... E05C/17/32 |
| DE | 10013563 A1 | * | 10/2001 | ........... B60R/21/34 |
| DE | 10014832 A1 | * | 10/2001 | ........... B60R/21/34 |
| JP | 06239268 A | * | 8/1994 | ........... B62D/25/10 |
| JP | 07108903 A | * | 4/1995 | ........... B60R/21/34 |
| JP | 07125606 A | * | 5/1995 | ........... B60R/21/34 |
| JP | 08276816 A | * | 10/1996 | ........... B60R/21/34 |
| JP | 08324380 A | * | 12/1996 | ........... B60R/21/34 |
| JP | 2000-79859 A | | 3/2000 | |
| WO | WO 0198119 A1 | * | 12/2001 | ........... B60R/21/34 |

* cited by examiner

*Primary Examiner*—Brian L. Johnson
*Assistant Examiner*—Kelly E. Campbell
(74) *Attorney, Agent, or Firm*—Shinjyu Global IP Counselors, LLP

(57) ABSTRACT

A vehicle air bag system is provided with an air bag that inflates and unfolds to cover the entire front surface of a front pillar 3. When it is judged based on the detection operation of a collision detection device 10 that there is a risk of colliding with a pedestrian, a hood pop-up device 11 is actuated and the rear end part of the engine hood 1 moves up, widening the gap between the rear end part and the front windshield 2. Simultaneously, the air bag module 15 is actuated and the air bag 18 expands out from the gap. The air bag inflates and unfolds so as to cover the entire front surface of the front pillar 3 from the base to the upper end thereof.

26 Claims, 15 Drawing Sheets

VEHICLE AIR BAG SYSTEM

BACKGROUND OF THE INVENTION

1. Field of the Invention

The present invention relates a vehicle air bag system. More specifically, the present invention relates to a vehicle air bag system that covers the front pillars of the vehicle body.

2. Background Information

The air bag system proposed in Laid-Open Japanese Patent Publication No. 5-281671 has an air bag module stored inside the front pillar such that the air bag inflates over the front surface of the front pillar. The air bag system proposed in Laid-Open Japanese Patent Publication No. 2000-79859 has an air bag located in the gap between the rear end edge of the engine hood and the front windshield such that the air bag inflates along the entire the rear end edge of the engine hood in the transverse direction.

In view of the above, there exists a need for an air bag system which is an improvement over the above-mentioned prior art. This invention addresses this need in the prior art as well as other needs, which will become apparent to those skilled in the art from this disclosure.

SUMMARY OF THE INVENTION

It has been determined from the disclosure of from the former invention, in which the air bag module is stored inside the front pillar, has the following drawbacks: the air bag module installability is poor because the closed cross sectional area of the front pillar is limited, the structure becomes complex, and the front pillar becomes larger making visibility poor.

It has been determined from the disclosure of from the latter invention is structured so that the air bag inflates and unfolds along the entire rear end edge of the engine hood in the transverse direction. Consequently, the air bag module is large and its installability is poor. Furthermore, such a structure is disadvantageous in terms of cost and the air bag cannot cover the entire front surface of the front pillar from the base part to the upper end part.

The present invention provides a vehicle air bag system that can inflate and unfold the air bag so as to cover the entire region reaching from the base part to the upper end part of the front side of the front pillar without harming the installability of the air bag module.

In accordance with one aspect of the present invention, a vehicle air bag system is provided with a collision detection device, a hood pop-up device and an air bag module. The collision detection device produces a detection signal upon detection of a collision between a front of a vehicle and an obstacle. The hood pop-up device is arranged under a rear end part of an engine hood to move up the rear end part of the engine hood when actuated based on the detection signal from the collision detection device. The air bag module that is arranged in a cowl top under the rear end part of the engine hood. The air bag module has an air bag that is inflated to expand out toward a front windshield from between the cowl top and the rear end part of the engine hood when the hood pop-up device is actuated. The air bag is configured to cover a region ranging from a base part to an upper end part of a front surface of a front pillar.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
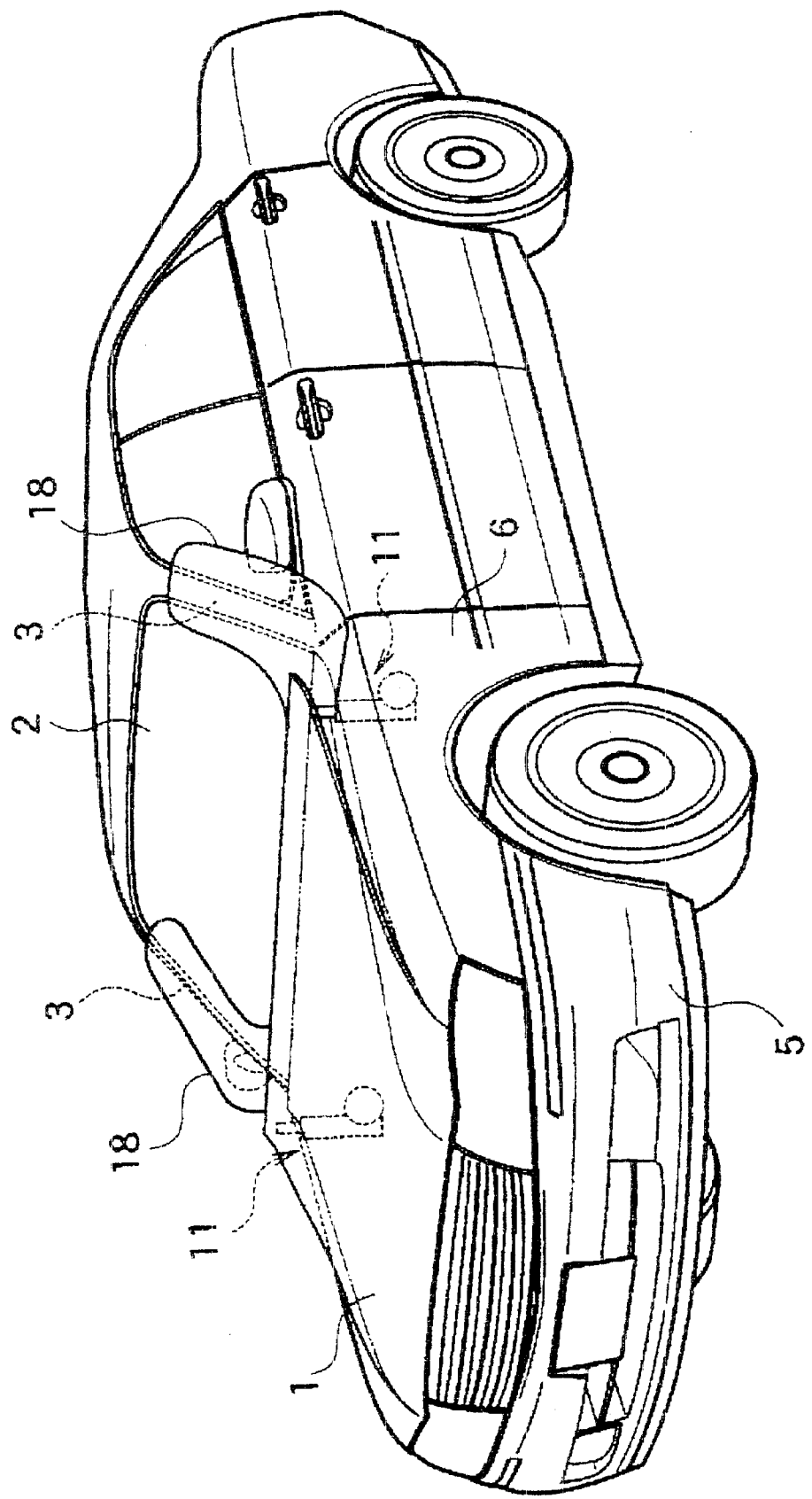
FIG. 1 is a perspective view of the overall appearance of an automobile that uses the present invention.
Figure 2:
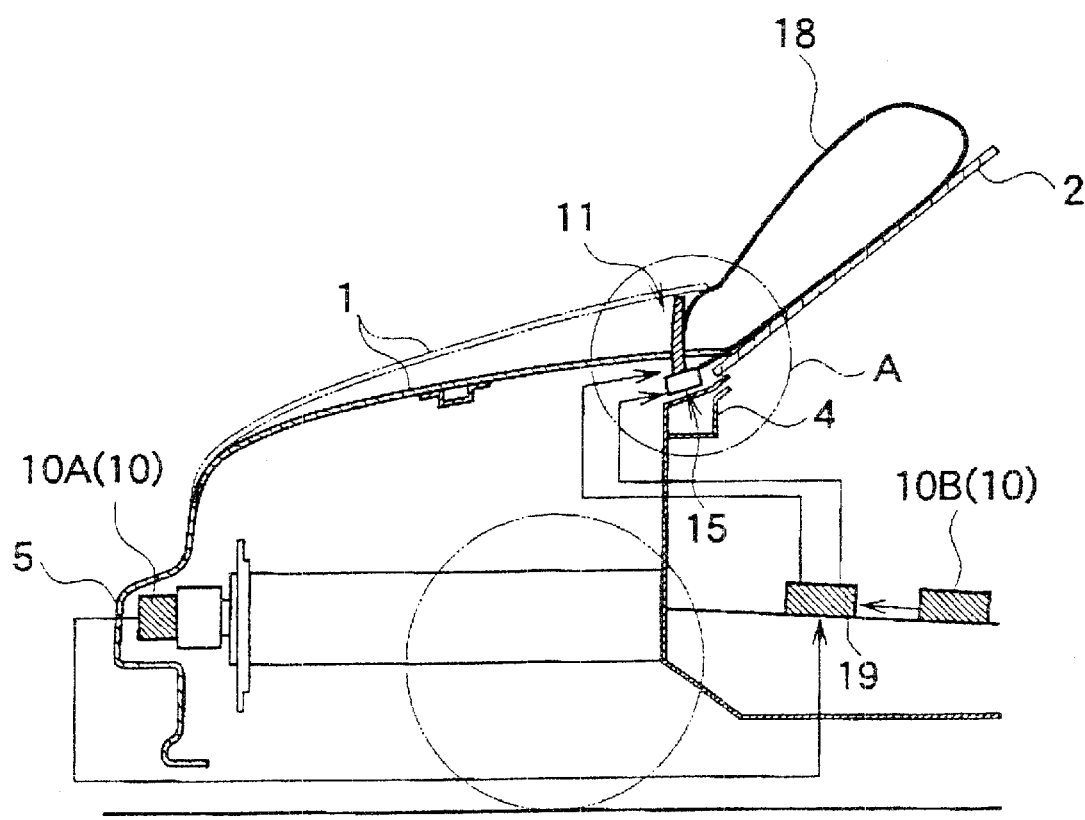
FIG. 2 is a partial cross sectional view showing the front portion of the automobile shown in FIG. 1.

Referring initially to FIG. 1, an overall perspective view of an automobile or vehicle V is illustrated equipped with an air bag system in accordance with a first embodiment of the present invention. FIG. 2 is a partial cross sectional view showing the front portion of the vehicle V shown in FIG. 1.

In both FIGS. 1 and 2, the vehicle V has an engine hood 1, a front windshield 2, a pair of front pillars 3 and a cowl top 4. The front pillars 3 extend vertically on both sides of the front windshield 2, while the cowl top 4 extends in a transverse direction at the bottom part of the front windshield 2. The bases of the front pillars 3 are typically joined to the side ends of the cowl top 4.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The air bag system of the present invention basically includes a collision detection device 10, a pair of hood pop-up devices 11 and a pair of air bag modules 15. The air bag system of the present invention serves to reduce an impact for pedestrians by covering the front pillars 3.

The hood pop-up devices 11 are arranged under both sides of the rear end part of the engine hood 1 to move up the rear end part of the engine hood 1. The hood pop-up devices 11 are actuated based on a detection signal from the collision detection device 10 that detects a collision between the front of the vehicle V and an obstacle.

The air bag modules 15 are arranged under both sides the rear end part of the engine hood 1. More specifically, the air bag modules 15 are preferably arranged on the cowl top 4 at positions that are slightly offset towards the center of the vehicle V from the positions where the hood pop-up devices 11 are arranged.

Figure 3:
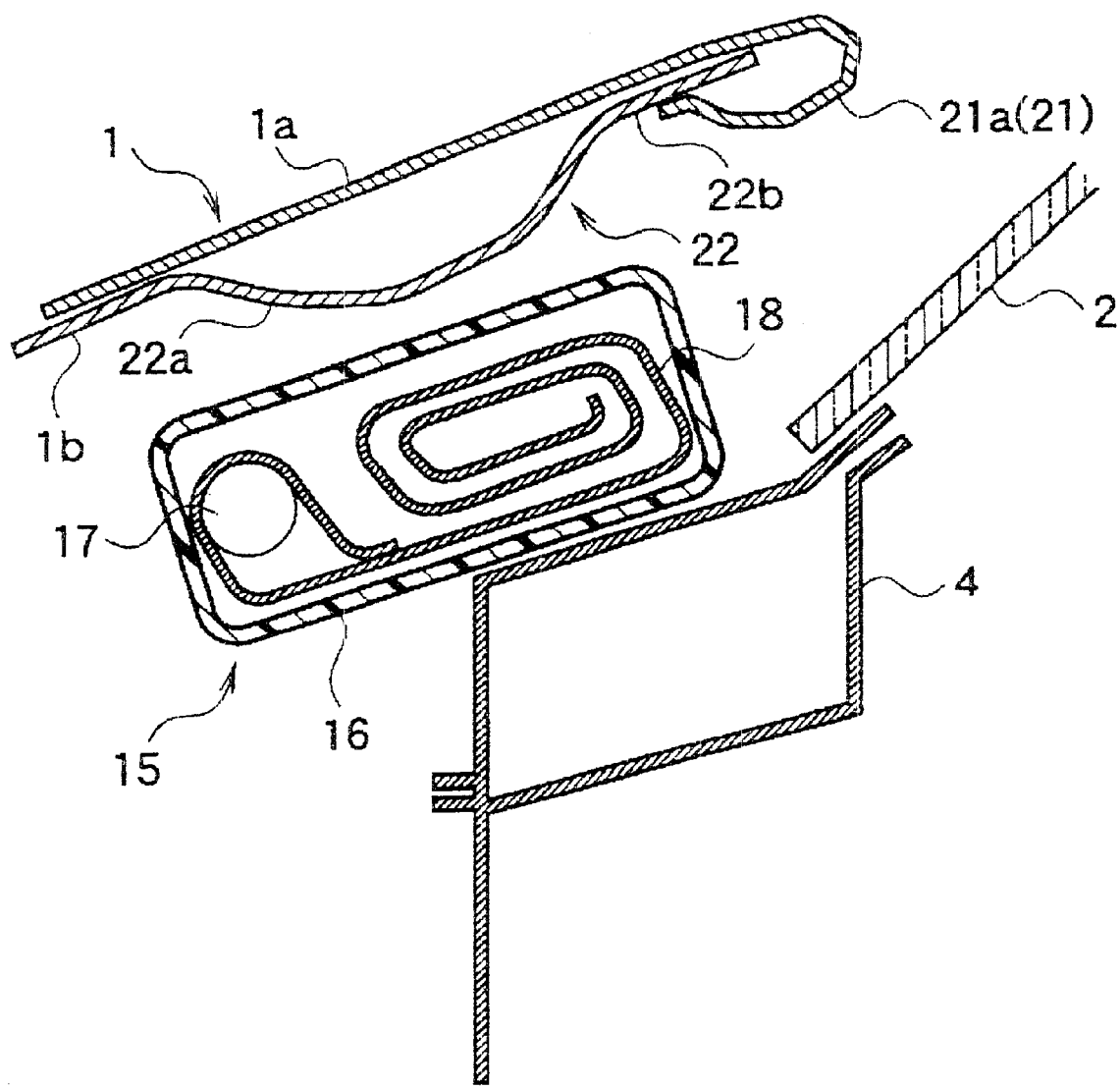
FIG. 3 is a partial cross sectional view that corresponds to region A in FIG. 2 and shows the first embodiment of the present invention.

Each air bag module 15 is arranged inside a module case 16 as shown in FIG. 3. Each air bag module 15 is equipped with an inflator 17 and an air bag 18. The inflator 17 is ignited and generates an inert gas when the hood pop-up device 11 is actuated based on the detection operation of the collision detection device 10. The air bag 18 is folded and stored inside the module case 16. The air bag 18 is inflated due to the gas generated by the inflator 17 so as unfold the air bag 18 to cover the entire region reaching from the base part to the upper end part of the front side of the front pillar 3.

Figure 4:
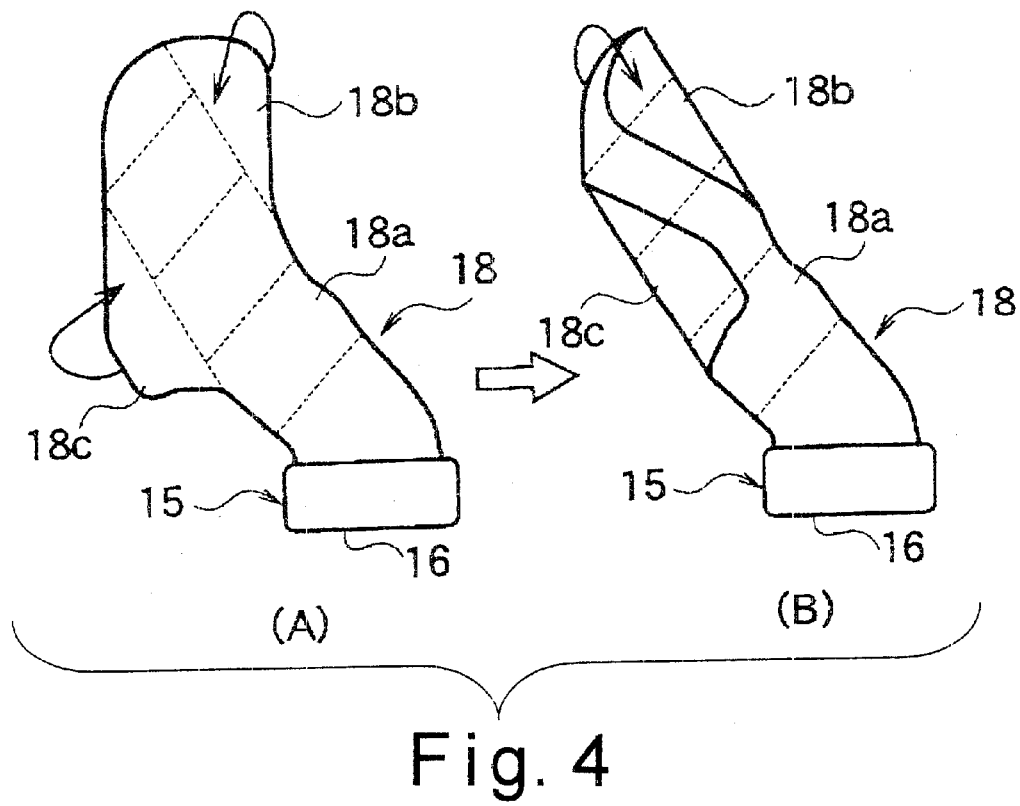
FIG. 4 illustrates the air bag folding procedure for the first embodiment of the present invention.

As shown in FIG. 4, the air bag 18 is equipped with a substantially rectangular the central part 18a and upper and lower sleeve parts 18b and 18c. The central part 18a of the air bag 18 inflates and unfolds long and at a slant from the module case 16 toward the front pillar 3. The upper and lower sleeve parts 18b and 18c that have the following characteristics: (1) they are provided on the central part 18a in a continuous manner; (2) each has a substantially triangular shape with its base side forming one of the lateral sides of substantially the upper half of the central part 18a located therebetween; and (3) they form a substantially rectangular shape that extends in the vertical direction when they inflate. Thus, when the air bag 18 inflates and unfolds, it covers the front surface of the front pillar 3 from the base part to the upper end part thereof as previously explained.

The air bag 18 is stored in the module case 16 as follows. First, the upper and lower sleeve parts 18b and 18c are folded on top of the substantially upper half of the central part 18a from the aforementioned base sides as indicated by the arrows in FIG. 4(A). Then, as indicated by the arrows in FIG. 4(B), the central part 18a is rolled or folded up from its upper end so that the upper end is rolled or folded on top of the upper surface of the inner end of the central part 18a.

The hood pop-up device 11 is affixed to the cowl top 4 or some other frame member in the engine compartment such as the hood ridge upper reinforcement (not shown) that is joined to both sides of the cowl top 4 and extends toward the front of the vehicle V. The hood pop-up devices 11 are located at positions that are further towards the outside of the vehicle V in the transverse direction than the air bag modules 15.

Figure 5:
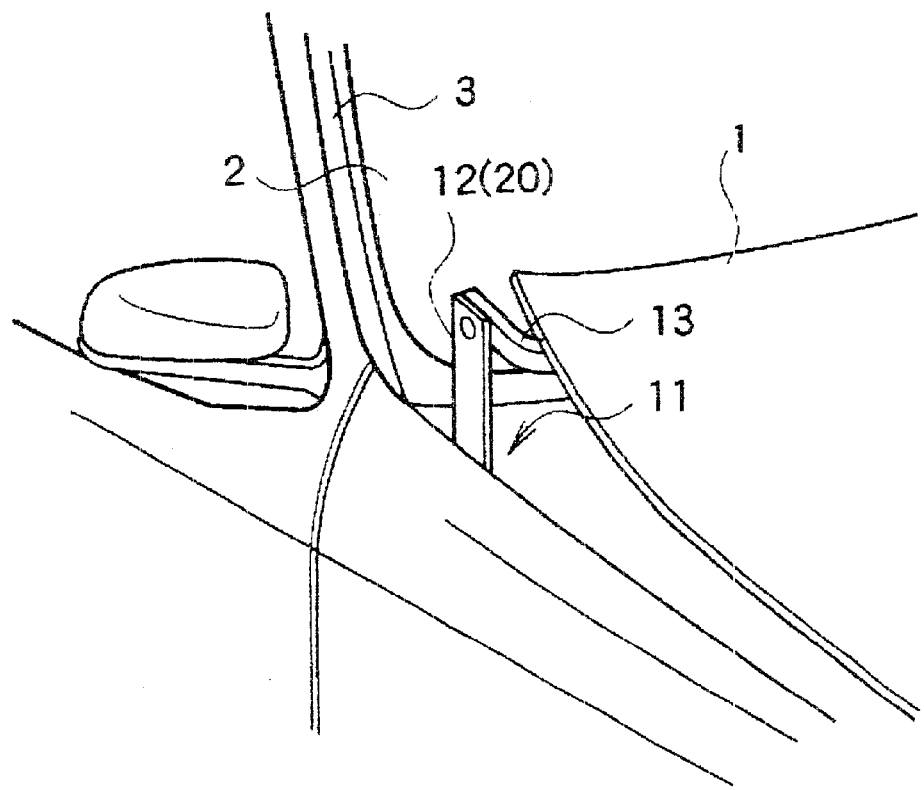
FIG. 5 is a perspective view of the up condition of the rear end edge of the engine hood in the first embodiment of the present invention.

Preferably, the hood pop-up device 11 is a device that electromagnetically raises the stay 12 by a prescribed lift amount instantaneously so that the rear end part of the engine hood 1 is moved up. In this embodiment, as shown in FIG. 5, a bracket 13 is coupled at one end with a pin to the upper end of the stay 12. The other end of the bracket 13 is fastened to the rear end part of the engine hood 1. The stay 12 and bracket 13 form a hood hinge.

Figure 6:
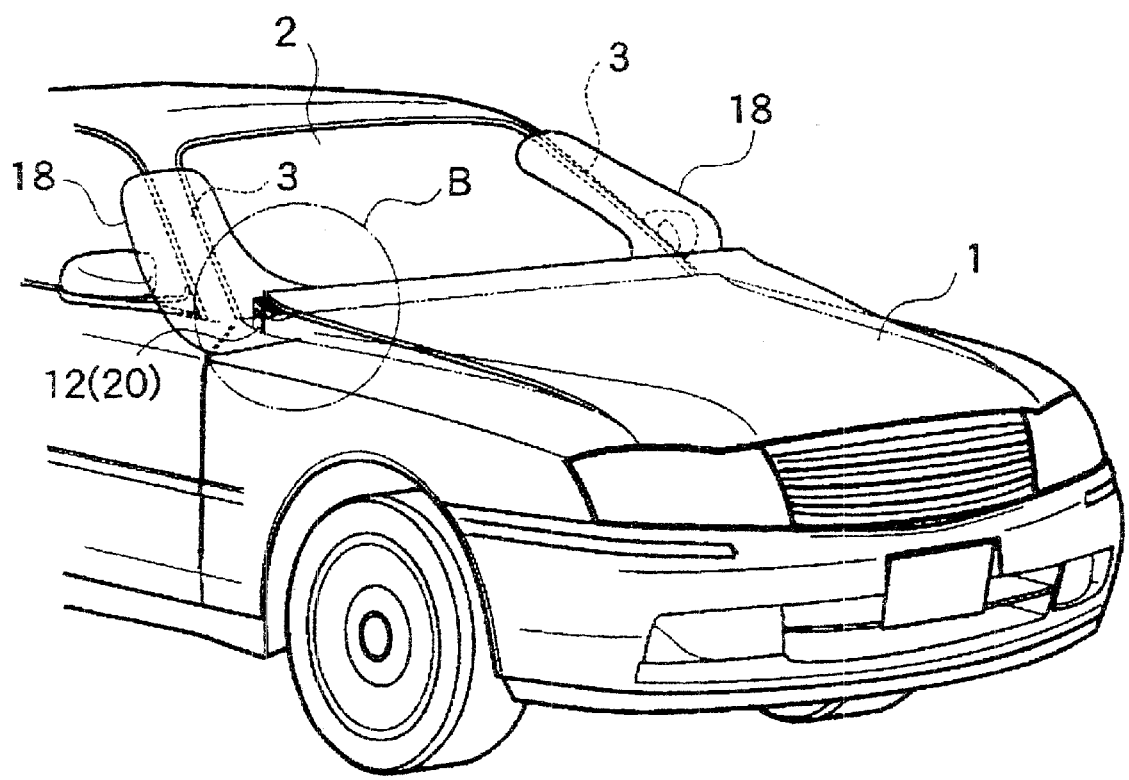
FIG. 6 is a perspective view showing the appearance of the inflated and unfolded condition of the air bags in the first embodiment of the present invention.
Figure 7:
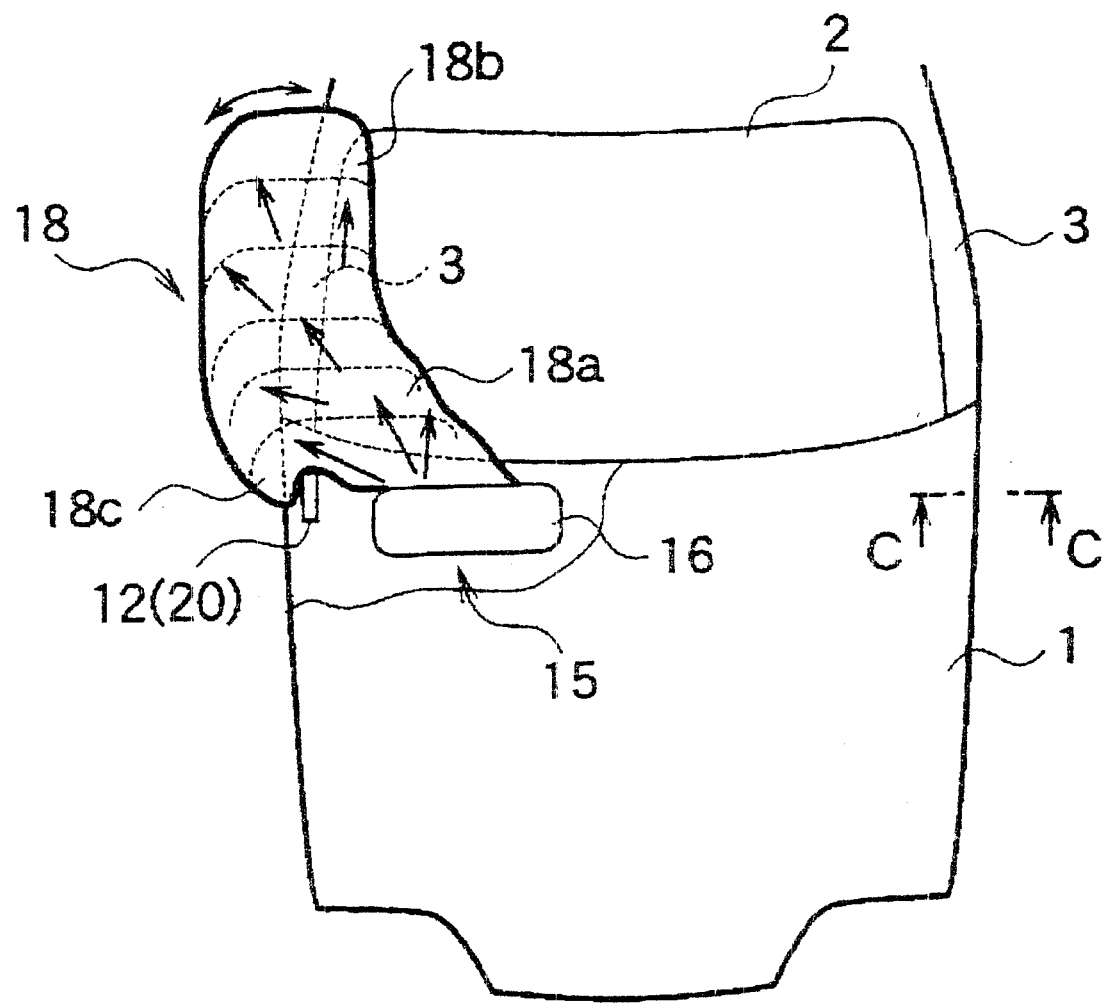
FIG. 7 is a partial plan view illustrating the unfolded condition of the air bags shown in FIG. 6.
Figure 8:
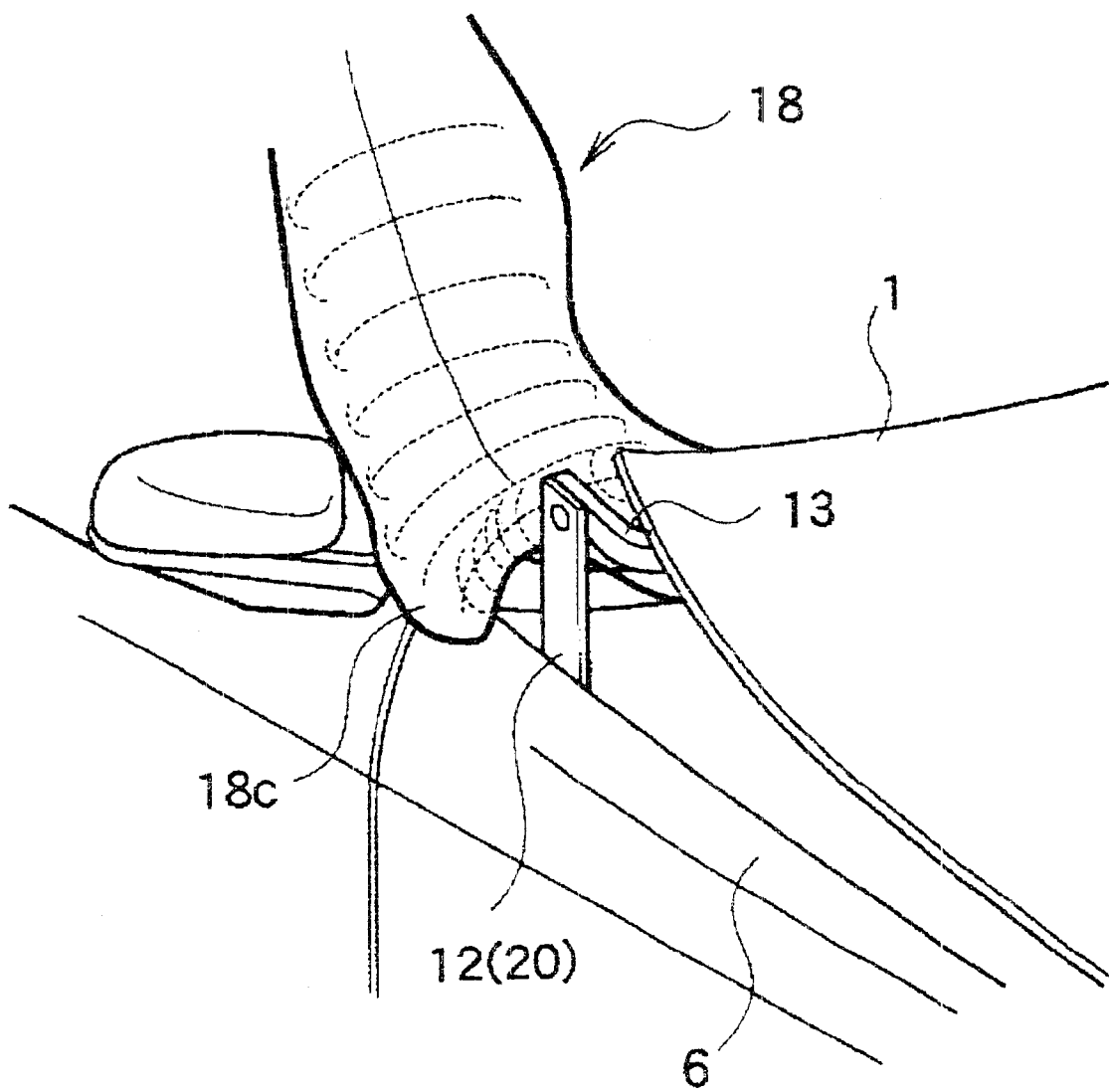
FIG. 8 is an enlarged perspective view of region B in FIG. 6.

The air bag modules 15 are installed at positions that are slightly offset towards the center of the vehicle V from the installation position of hood pop-up device 11, as previously explained. The lower sleeve part 18c contacts the stay 12 when the air bag 18 inflates and unfolds after the rear end part of the engine hood 1 has moved up. Therefore, in this embodiment, the stay 12 is used effectively as a stopper 20, which prevents the air bag 18 from shifting sideways in the transverse direction of the vehicle V as described later. In other words, as seen in FIGS. 7 and 8, the stay/stoppers 12(20) are lateral positioning members configured and arranged laterally in relation to the air bag modules 15 to support the lower ends or lower sleeve parts 18c of the air bags 18 when the air bags 18 expand along the front surfaces of the front pillars 3. Thus, the air bags 18 are held in the positions shown in FIGS. 6–8, i.e., along the front surfaces of the front pillars 3.

In order for the stopper 20 to prevent the sideways shifting of the air bag 18 even more effectively, the lower sleeve part 18c is sized to wrap around stopper 20 when it inflates and unfolds, as shown in FIGS. 7 and 8.

A deformation prevention member 21 that prevents the rear end part of the engine hood 1 from deforming due to the inflation and unfolding of the air bag 18 is provided on the rear end part of the engine hood 1 in at least the region where the air bag 18 inflates and unfolds. Also provided is an upper guide 22 that prevents the air bag 18 from arching up when the air bag 18 expands out from the gap between the rear end part of the engine hood 1 and the front windshield 2.

The perimeter of the engine hood 1 is formed so that the perimeter of the outer hood panel 1a is joined with the perimeter of the inner hood panel 1b by hemming or seaming. In this embodiment, as shown in FIG. 3, the required region of the rear end part of the hood 1 is hemmed such that the rear end edge of the outer hood panel 1a is expanded downward in a curved shape. This results in a so-called the circular folded edging part 21a that increases rigidity of the hood 1, and thus, serves as the aforementioned the deformation prevention member 21.

The inner hood panel 1b has a downwardly facing protruding part 22a that is formed so as to expand in a curved shape on the inner hood panel 1b at positions above the air bag modules 15 and in front of the circular folded edging part 21a. The aforementioned guide 22 for preventing the air bag from arching up comprises the circular folded edging part 21a, the protruding part 22a, and the recessed part 22b formed between the circular folded edging part 21a and the protruding part 22a.

The gap between the rear end part of the engine hood 1 and the front windshield 2 is set so that, under normal conditions, it is large enough to store a wiper device (not shown). Therefore, the circular folded edging part 21a and the protruding part 22*a* protrude by an amount that does not hinder the storage of the wiper device.

Figure 9:
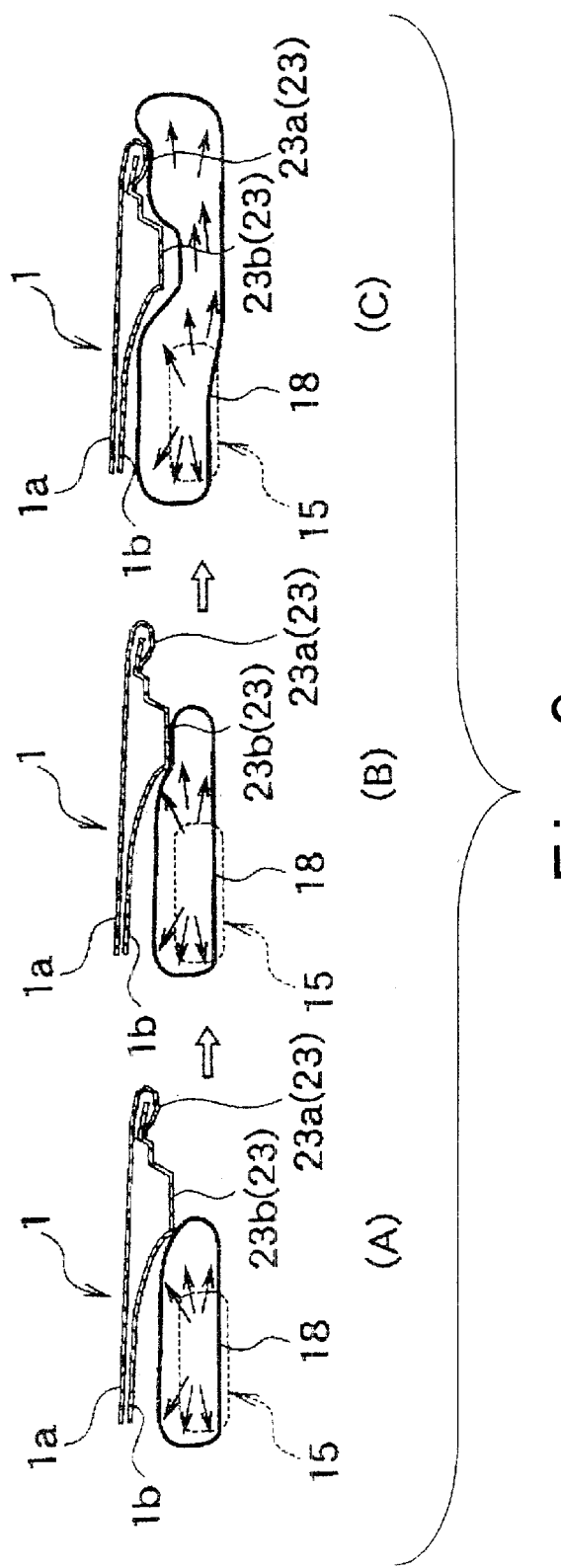
FIG. 9 shows partial cross sections that were taken along line C—C in FIG. 7 and serve to explain how the first embodiment of the present invention functions to prevent the air bag from shifting sideways.
Figure 10:
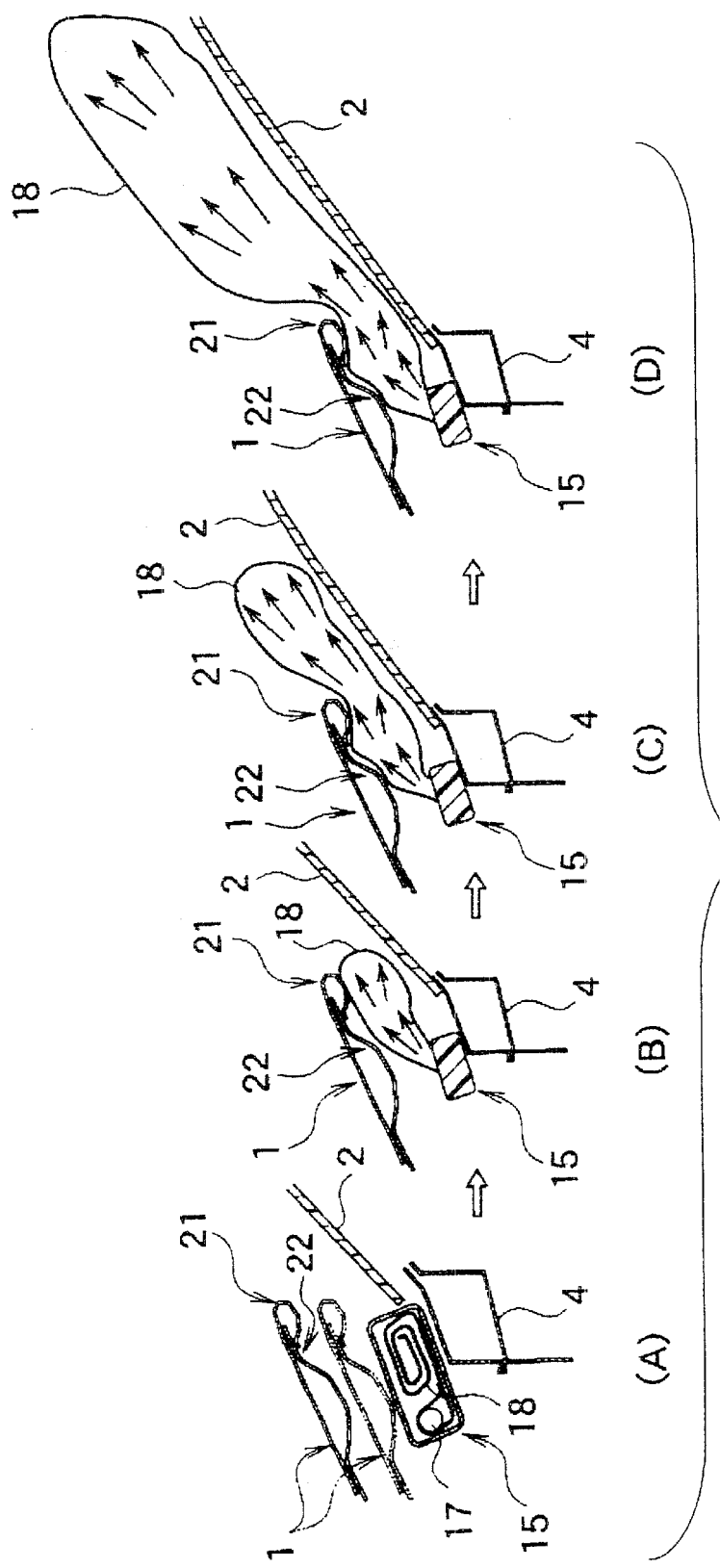
FIG. 10 shows partial cross sections that illustrate the inflation and unfolding of the air bag of the first embodiment of the present invention in stages.

Additionally, a lateral guide 23 that prevents the air bag 18 from shifting sideways toward the outside in the transverse direction of the vehicle V when the air bag 18 expands is provided on the lower side of the rear end part of the engine hood 1. In this embodiment, the lateral guide 23 prevents sideways shifting is formed as shown in FIG. 9, by forming a circular folded edging part 23*a* located in a region corresponding to the installation section of the air bag module 15 on the rear end lateral edge of the outer hood panel 1*a*. In addition to the circular folded edging part 23*a*, a downwardly protruding part 23*b* is also formed on the lateral part of the rear end of the inner hood panel 1*b* such that the lateral guide 23 comprises the circular folded edging part 23*a* and the protruding part 23*b*. The lateral guide 23 acts as sideways shifting prevention guide means.

In this embodiment, the collision detection device 10 comprises a distance sensor 10A and a G sensor 10B. The distance sensor 10A is arranged as shown in FIG. 2 on the lower side of the front bumper 5 and electrically detects a collision between the front of the vehicle V and an obstacle. The G sensor 10B is used with conventional air bags that reduces an impact to passengers in a frontal collision, and thus, detects the deceleration in the longitudinal direction of the vehicle V and generates an electric signal.

The distance sensor 10A electrically detects the distance between the automobile and a pedestrian in front of the automobile. This distance is outputted to the controller 19 as a trigger signal that actuates the hood pop-up device 11 and the air bag module 15. The controller 19 executes a prescribed computation based on the trigger signal and the detection signal from the G sensor 10B. As discussed later, when it is determined that there is the risk of a collision with the pedestrian, the controller 19 sends a prescribed actuation signal (actuation current) to the hood pop-up device 11 and the air bag module 15.

Figure 17:
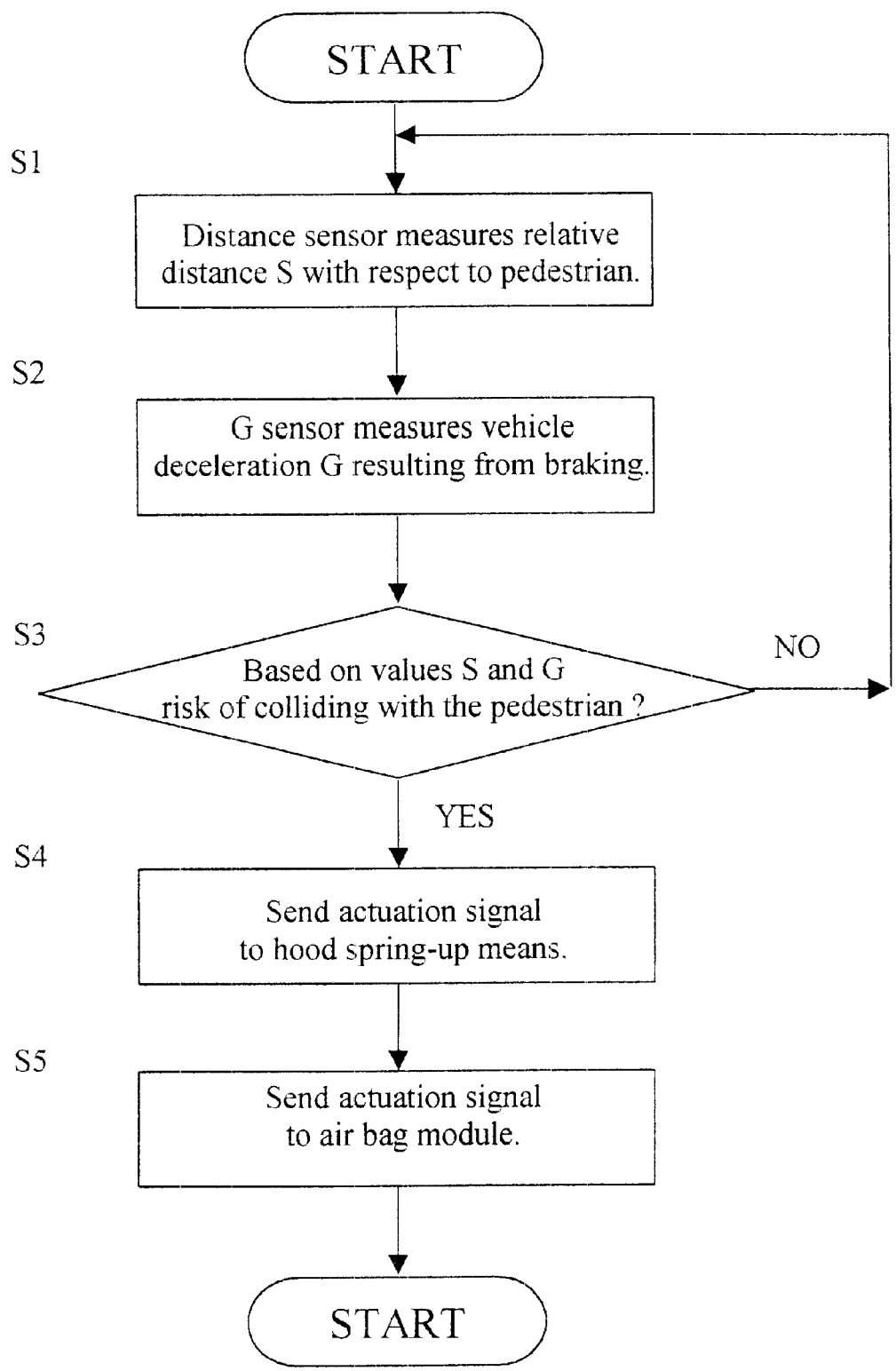
FIG. 17 is a flow chart illustrating an example of the control operations of the air bag system of the present invention.

Next, the control operations of the air bag system of this first embodiment will be discussed using the flowchart shown in FIG. 17.

In step S1, when a pedestrian approaches the front of the vehicle V, the distance sensor 10A which is arranged in the front bumper 5 of the front end of the vehicle V as previously described, measures the relative distance S between the vehicle V and the pedestrian.

When a pedestrian approaches the front of the automobile, the driver normally applies the vehicle brakes rapidly so as to avoid a collision with the pedestrian. In step S2, the G sensor 10B detects the generated deceleration G of the vehicle V resulting from this rapid braking.

In step S3, the controller 19 executes a prescribed computation based on relative distance S measured by the distance sensor 10A and the value of the deceleration G measured by the G sensor 10B and determines whether or not there is a risk of collision with the pedestrian.

When it is judged that a collision risk exists (YES) in step S3, the control moves to step S4. The actuation current is sent to the electromagnetic actuator of the hood pop-up devices 11, the stays 12 are lifted instantaneously, and the rear end part of the engine hood 1 is moved up by a prescribed lift amount.

The amount of time that elapses from when the actuation current is supplied to the hood pop-up devices 11 until the rear end part of the engine hood 1 moves up by a prescribed lift amount is preset in the controller 19. After the prescribed amount of time has elapsed, the control moves to step S5 and actuation current is sent to the air bag modules 15. The inflators 17 are ignited and generate gas. The pressure of this gas causes the air bags 18 to expand out toward the front windshield 2 from the gap between the rear end part of the engine hood 1 and the front windshield 2. The air bags 18 inflate and unfold in such a manner that they cover the entire regions from the base parts to the upper end parts of the front surfaces of the front pillars 3.

Thus, the rear end part of the engine hood 1 is moved up by the hood pop-up devices 11 and the gap between the rear end part of the engine hood 1 and the front windshield 2 is widened. The air bag modules 15 are actuated and the air bags 18 expand almost simultaneously with the widening of this gap. Therefore, the air bags 18 expand smoothly out from the gap toward the front windshield 2. The air bags 18 inflate and unfold so as to cover the entire front surface of the front pillar 3 as described previously.

As a result, the air bags 18 prevent direct contact between the pedestrian and the front pillars 3 and the air bags 18 makes it possible to soften the impact dependably.

In the initial stage of the inflation of the air bags 18, the moving up of the rear end part of the engine hood 1 creates a gap between the rear end lateral part of the engine hood 1 and the front fender 6. There is a tendency for the air bag 18 to shift sideways to the outside in the transverse direction of the vehicle V and pass through this gap. This sideways shifting of the air bags 18 is deterred by the guide 23 (the sideways shifting prevention guide device) provided on the lower side of the rear end part of the engine hood 1 and proper inflation and unfolding toward the front pillars 3 can be accomplished.

In this embodiment, the guide 23 comprises the circular folded edging part 23*a* formed on the rear end lateral edge of the outer hood panel 1*a* and/or the protruding part 23*b* formed on the lateral part of the rear end part of the inner hood panel 1*b*. As a result, the guide does not require separate specialized members and is advantageous in terms of cost. Also, when the guide 23 is formed from the circular folded edging part 23*a* and the protruding part 23*b*, the sideways shifting of the air bags 18 can be deterred at multiple stages during the inflation of the air bags 18 as shown in FIGS. 9(A) to (C), and thus, the sideways-shifting prevention effect can be increased.

Also, the air bags 18 touch the rear end part of the engine hood 1 in the initial stage of inflation and unfolding when the air bags 18 expand out toward the front windshield 2 from the gap between the rear end part of the engine hood 1 and the front windshield 2. However, since the deformation prevention member 21 is provided on the rear end part of the engine hood 1, deformation of the rear end part of the engine hood 1 by the internal pressure of the air bags 18 is prevented and the air bags 18 can be made to unfold properly without hampering the unfolding performance and unfolding direction of the air bags 18.

More particularly, in this embodiment, the deformation prevention member 21 does not require special reinforcing members and is advantageous from the standpoints of both design and cost because it comprises the circular folded edging part 21*a* formed on the rear end edge of the outer hood panel 1*a*. Furthermore, since the circular folded edging part 21*a* protrudes downward in a curved shape, the circular folded edging part 21*a* can deter unstable behavior in which the air bags 18 wrap upward around the rear end edges of the engine hood 1 in the initial stage of the inflation of the air bags 18.

Additionally, the upper guide 22, which prevents the air bags 18 from arching up, is provided on the lower side of the rear end part of the engine hood 1. Consequently, in the initial stage of the inflation of the air bags 18, the upper guide 22 deters unstable behavior in which the air bags 18 arch up and separate from the front pillars 3 and the air bags 18 can be made to inflate and unfold properly along the front surfaces of the front pillars 3.

More specifically, the upper guide 22 serves as an arch-up prevention guide device that comprises the circular folded edging part 21a, the curved protruding part 22a provided on the inner hood panel 1b, and the recessed part 22b formed between the circular folded edging part 21a and curved protruding part 22a. Consequently, as the air bags 18 inflate, the upper surfaces of the base fabric align with the undulated shape of the upper guide 22 as shown in FIGS. 10(A) to (D) and the upper surfaces of the base fabric takes on an undulated shape. The flow of gas along the upper surfaces of the insides of the air bags 18 is directed downward at one point (as indicated by the arrows in the same figure) due to the undulated shape and the mainstream of the gas flow is made to flow substantially in alignment with the slant of the front windshield 2 and the front pillar 3. As a result, the arch-up behavior of the air bags 18 can be effectively deterred.

The air bags 18 are equipped with a substantially rectangular the central part 18a that inflates and unfolds long and at a slant from the module cases 16 toward the front pillars 3 and upper and lower sleeve parts 18b and 18c that have the following characteristics: (1) they are provided on the central part 18a in a continuous manner; (2) each has a substantially triangular shape with its base side forming one of the lateral sides of substantially the upper half of the central part 18a therebetween; and (3) they form a substantially rectangular shape that extends in the vertical direction and cover the front surface of the front pillar 3 from the base to the upper end thereof when they inflate. Thus, when the air bags 18 inflate, substantially rectangular the central parts 18a unfold long and at a slant from the module cases 16 toward the front pillars 3. After central parts 18 have inflated, the upper and lower sleeve parts 18b and 18c inflate and cover the entire front surfaces of the front pillars 3 from the base part to the upper end part thereof, as shown in FIGS. 1, 6, and 7. Consequently, the installation locations of the air bag modules 15 are not limited to the areas around the bases of the front pillars 3. Instead, the air bag modules 15 can be installed in positions that are offset from the bases of the front pillars 3 toward the center of the vehicle V and the degree of freedom of the air bag module installation layout can be increased.

The air bag 18 is stored in the module case 16 as follows: upper and lower sleeve parts 18b and 18c of are folded onto the substantially upper half of the central part 18a about the aforementioned base sides; then, the central part 18a is rolled up from its upper end so that the rolled up end is on top. As a result, the unfolding of the air bag 18 is directed upward during inflation and interferes little with the front windshield 2. Thus, the unfolding performance is not hampered by interference of the air bag 18 with the front windshield 2 and the front pillar 3.

Incidentally, if the central part 18a were rolled up from its upper end so that the rolled up end is on the bottom, the unfolding of the air bag 18 would be directed downward during inflation and there would be the possibility that the airbag would readily interfere with the front windshield 2 and the front pillar 3. Therefore, one can understand the advantageousness of the unfolding performance provided by configuration of the air bag 18 in this embodiment.

Furthermore, since upper and lower sleeve parts 18b and 18c are folded on top of the central part 18a, sleeve parts 18b and 18c do not interfere with the front windshield 2 or the front pillar 3 the central part 18a when upper and lower sleeve parts 18b and 18c inflate and unfold after the central part 18a has inflated and unfolded. Therefore, the unfolding performance of the air bag 18 can be improved.

Thus, the entire front surfaces of the front pillars 3 can be covered when the air bags 18 inflate and unfold. As a result of the long, narrow unfolding behavior of the air bags 18 along the front pillars 3 in the vertical directions, it is possible for the air bags 18 to shift sideways in the transverse direction of the vehicle V as shown in FIG. 7. More specifically, when substantially rectangular the central part 18a first inflates and unfolds at a slant toward the front pillars 3 as in this embodiment, the degree of shifting toward the outside in the transverse direction of the vehicle tends to become large. When this occurs, the lower lateral part of the air bag 18 that faces the outside in the transverse direction contacts the stay 12 of the hood pop-up device 11 and the stay 12 can function as the stopper 20 to prevent the air bag 18 from shifting sideways.

More specifically, the lower part of the air bag 18, i.e., the lower sleeve part 18c, is sized so that it wraps around the stay 12 when the air bag inflates and unfolds, as shown in FIGS. 7 and 8. Since this arrangement increases the degree to which the air bag wedges into the stay 12, the invention is highly effective at preventing the sideways shifting of the air bag 18. The air bag 18 can be made to inflate and unfold properly such that it does not shift sideways in the traverse direction of the vehicle with respect to the front surface of the front pillar 3 and the unfolding stability of the air bag 18 can be increased.

Also, this embodiment is advantageous from the standpoints of both design and cost because uses the stays 12 of the hood pop-up devices 11 effectively as the stoppers 20 for preventing the sideways shifting of the air bags 18.

SECOND EMBODIMENT

Figure 11:
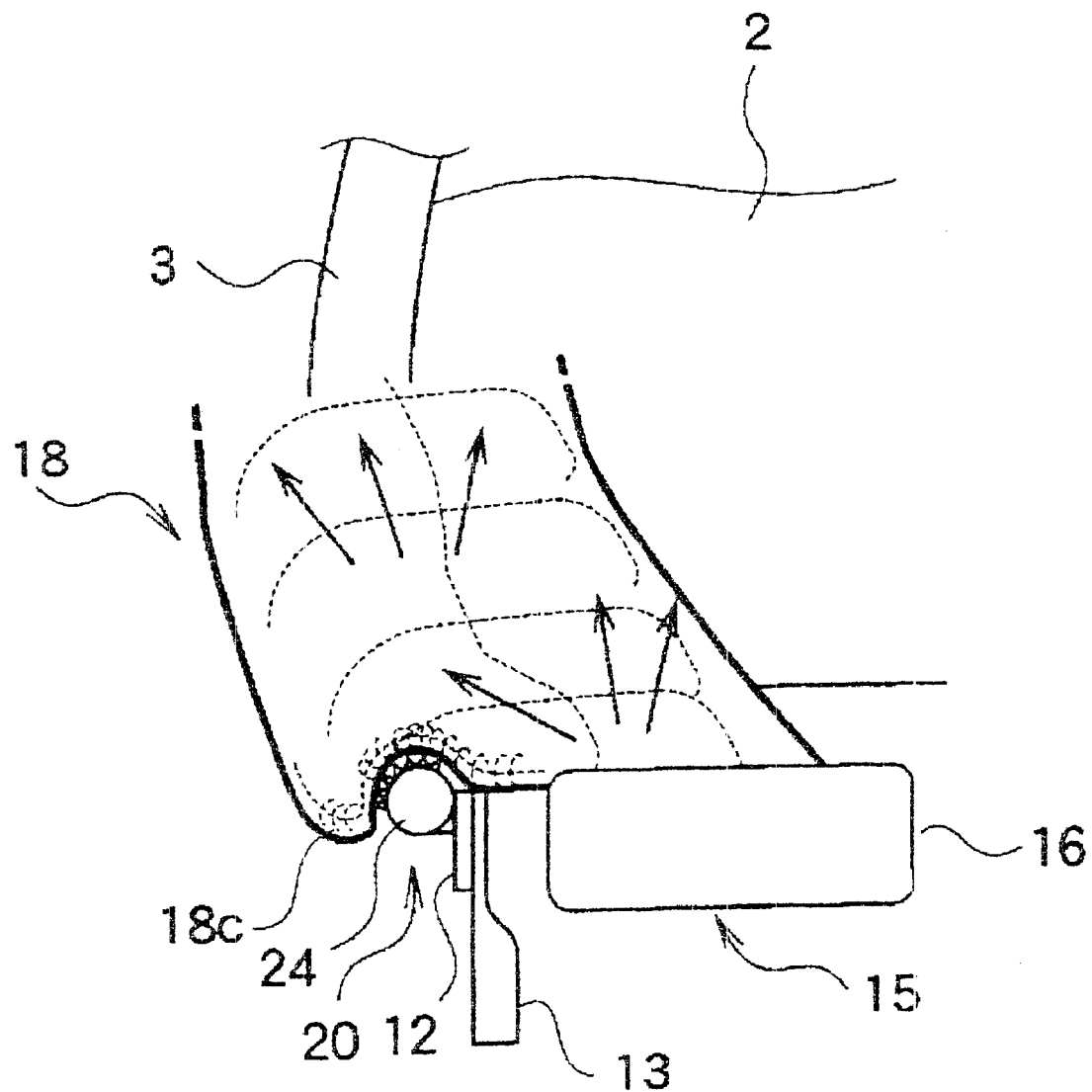
FIG. 11 is a partial plan view illustrating the sideways shifting prevention guide device of the second embodiment of the present invention.

Referring now to FIG. 11, a vehicle air bag system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In this embodiment, a vertically oriented projection 24 having undulations on an arc-shaped circumferential surface is provided on a rear edge of the stay 12 that serves as the stopper 20 in the first embodiment.

Therefore, this feature of the second embodiment adds to the effects of the first embodiment. Since the lower lateral part (sleeve part 18c) of the base fabric wedges into the arc-shaped, undulated circumferential surface of the projection 24 when the air bag 18 inflates and unfolds, the air bag 18 does not slip with respect to the stay 12 and the sideways shifting prevention effect with respect to the air bag 18 can be increased.

THIRD EMBODIMENT

Figure 12:
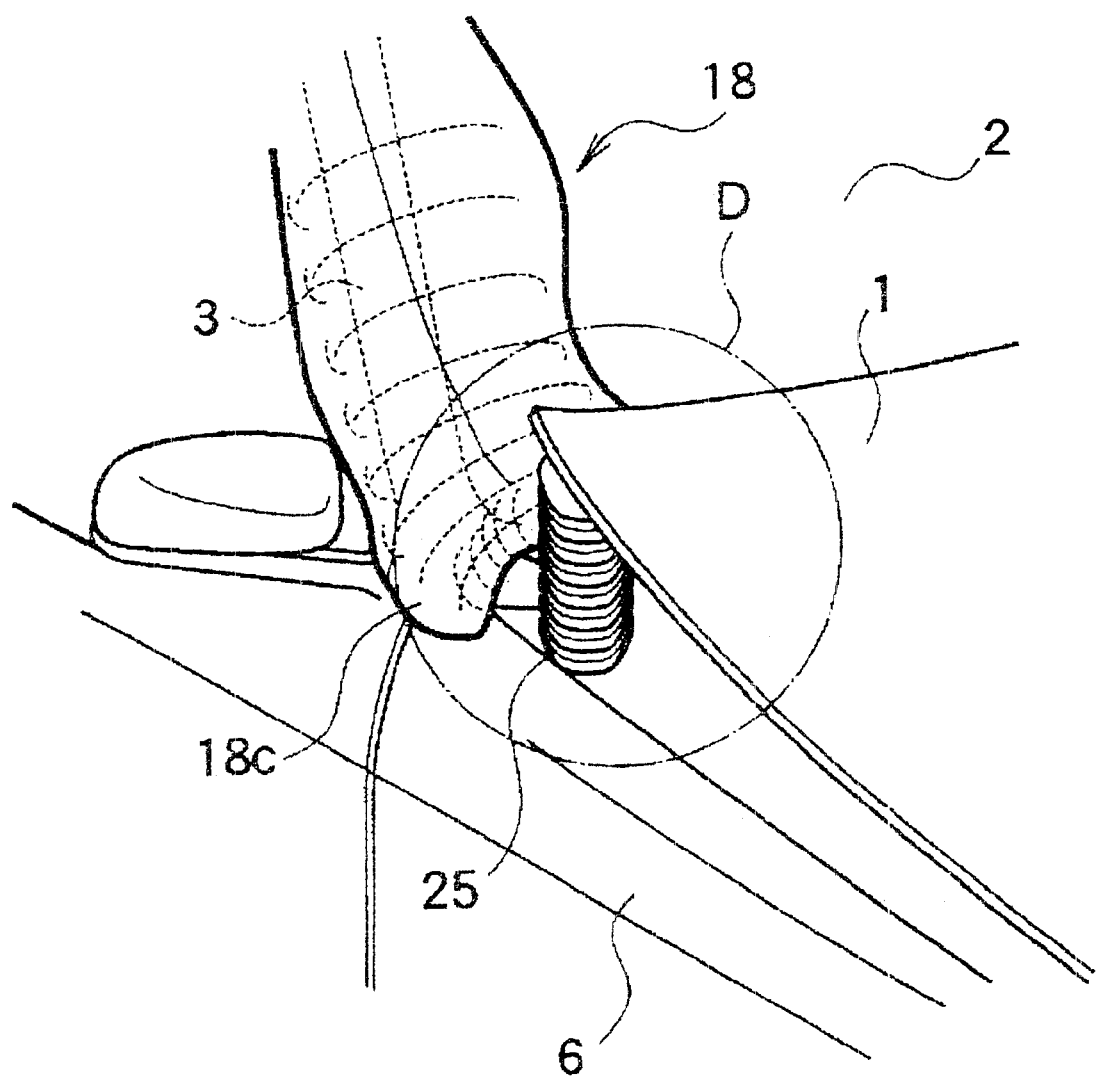
FIG. 12 is a perspective view showing the appearance the sideways shifting prevention guide device of the third embodiment of the present invention.
Figure 13:
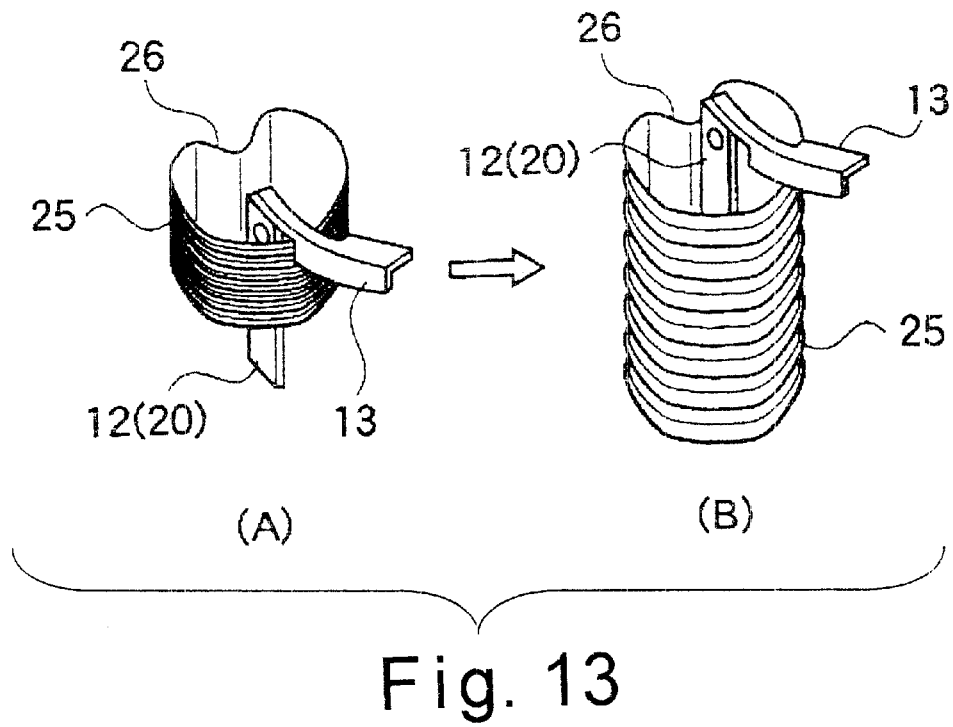
FIG. 13 is a partial perspective view of the key components in region D of FIG. 12.
Figure 14:
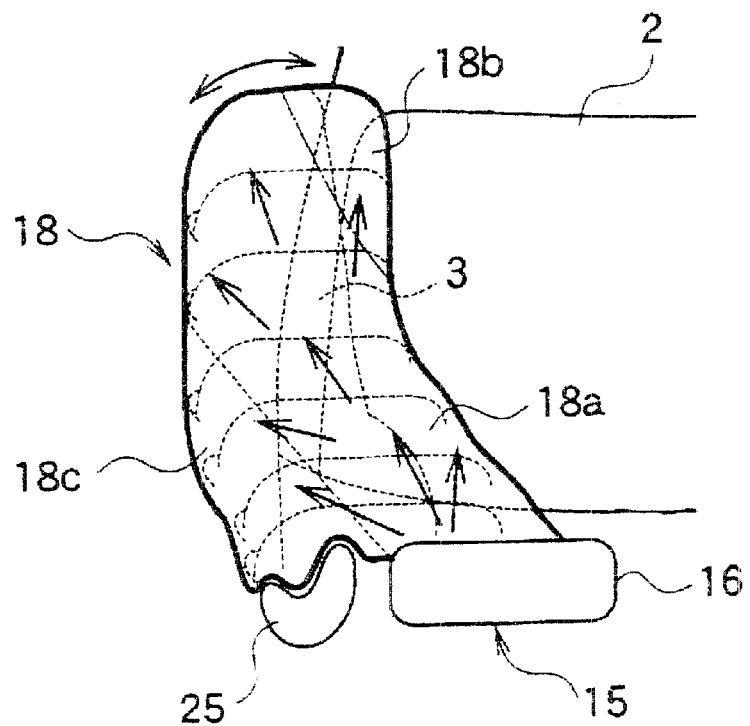
FIG. 14 is a partial plan view illustrating the sideways shifting prevention guide device of the third embodiment of the present invention.

Referring now to FIGS. 12 to 14, a vehicle air bag system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. In this embodiment, a cylindrical cover 25 covers the stay 12 that serves as the stopper 20 in the first embodiment.

The cover 25 has a bellows form that is made of an elastic material, such as plastic or rubber, with sufficient rigidity to retain its shape. The cover 25 is flexible so that it can follow the behavior of the stay 12 as shown in FIGS. 13(A) and (B). The cover 25 has a recessed part 26 formed in substantially the center of its rearwardly facing lateral surface so as to extend in the vertical direction.

Thus, the third embodiment adds to the effects of the first embodiment. Harm to the air bag 18 can be prevented because cylindrical the cover 25 prevents direct contact between the stay 12 and the base fabric of the air bag 18 as shown in FIG. 12.

Also, since the base fabric of the air bag 18 aligns with the recessed shape of the rear surface of cylindrical the cover 25 and wedges into recessed part 26 as shown in FIG. 14, the air bag 18 does not slip with respect to cylindrical the cover 25 and the sideways shifting prevention effect can be increased.

Each of the aforementioned embodiments uses the stays 12 of the hood pop-up device 11 as the stopper 20 for preventing sideways shifting of the air bag 18 and places one each in positions to the outside of air bag modules 15 (left and right sides) in the transverse direction of the vehicle V. However, it is also acceptable to install a plurality of separate stoppers 20 in addition to the stays 12 so that the air bag 18 is even more reliably prevented from shifting sideways.

The air bag 18 can also be housed inside the module case 16 by folding the lower sleeve part 18c onto substantially the upper half of the substantially rectangular central part 18a such that it is on the bottom of substantially the lower half of the central part 18a and rolling up the central part 18a from its upper end so that the rolled-up end is on top as previously described. In the late stage of the inflation and unfolding of the air bag 18, the lower sleeve part 18c unfolds downward and kicks the stay 12 (i.e., the stopper 20). As a result, the air bag 18 is deterred from shifting sideways toward the outside in the transverse direction of the vehicle V and the sideways shifting prevention effect can be increased.

FOURTH EMBODIMENT

Figure 15:
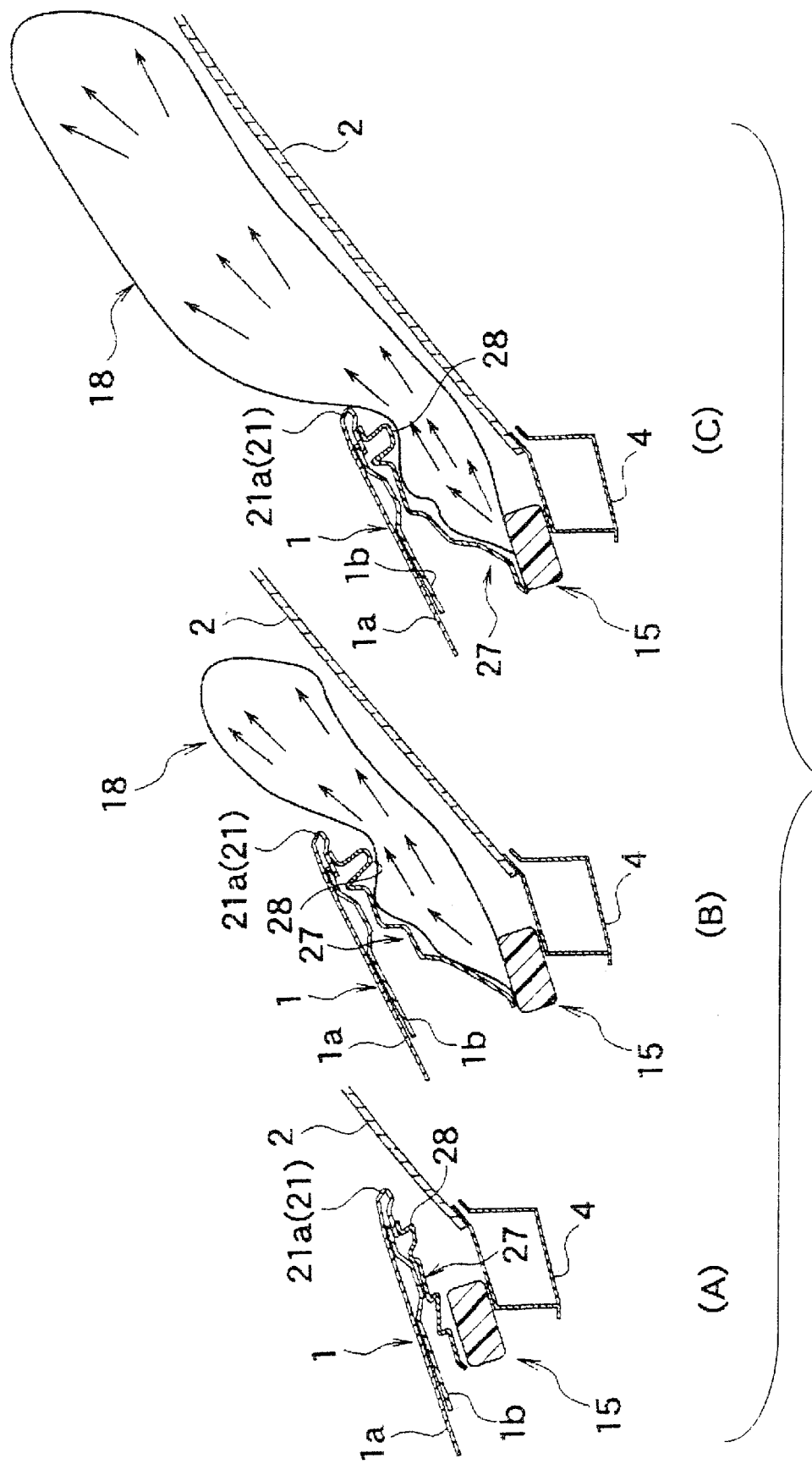
FIG. 15 shows partial cross sections that illustrate the inflation and unfolding of the air bag of the fourth embodiment of the present invention in stages.

Referring now to FIG. 15, a vehicle air bag system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. In this embodiment, the upper guide 22 that prevents the air bag 18 from arching up in the first embodiment comprises a connecting member 27 arranged so as to span between the upper surface of the module case 16 to the vicinity of the circular folded edging part 21a on the rear end edge of the engine hood 1.

The connecting member 27 is made of an elastic material, such as plastic, with sufficient rigidity to retain its required shape. The rear end part of the connecting member is provided with downward-projecting protruding part 28, which is stepped shape in the longitudinal direction of the vehicle V. It is flexible and capable of elastic deformation such that it can follow the behavior of the rear end part of the engine hood 1.

Thus, in the fourth embodiment, as the air bag 18 inflates and unfolds, the upper surface of the air bag base fabric aligns with the shape of protruding part 28 on the rear end part of the connecting member 27 as shown in FIGS. 15(A) to (C) and the upper surface of the base fabric takes on an undulated shape. The flow of gas along the upper surface of the inside of the air bag is directed downward at one point (as indicated by the arrows in the same figure) due to the undulated shape and the mainstream of the gas flow is made to flow substantially in alignment with the slant of the front windshield 2 and the front pillar 3. As a result, similar effects to those of the first embodiment can be achieved.

Also, the protruding part 28 and the longitudinally stepped shape of the connecting member 27 make is possible to tune the direction of the gas flow along the upper surface of the inside of the air bag 18 and to guide the upward unfolding behavior of the air bag 18 in a continuous manner from the upper surface of the module case 16 to the rear end edge of the engine hood 1. Thus, the controllability of the unfolding behavior can be improved.

Furthermore, the elasticity of the connecting member 27 can absorb variations in the upward behavior of the air bag 18 and even further improve the controllability of the unfolding behavior of the air bag 18.

FIFTH EMBODIMENT

Figure 16:
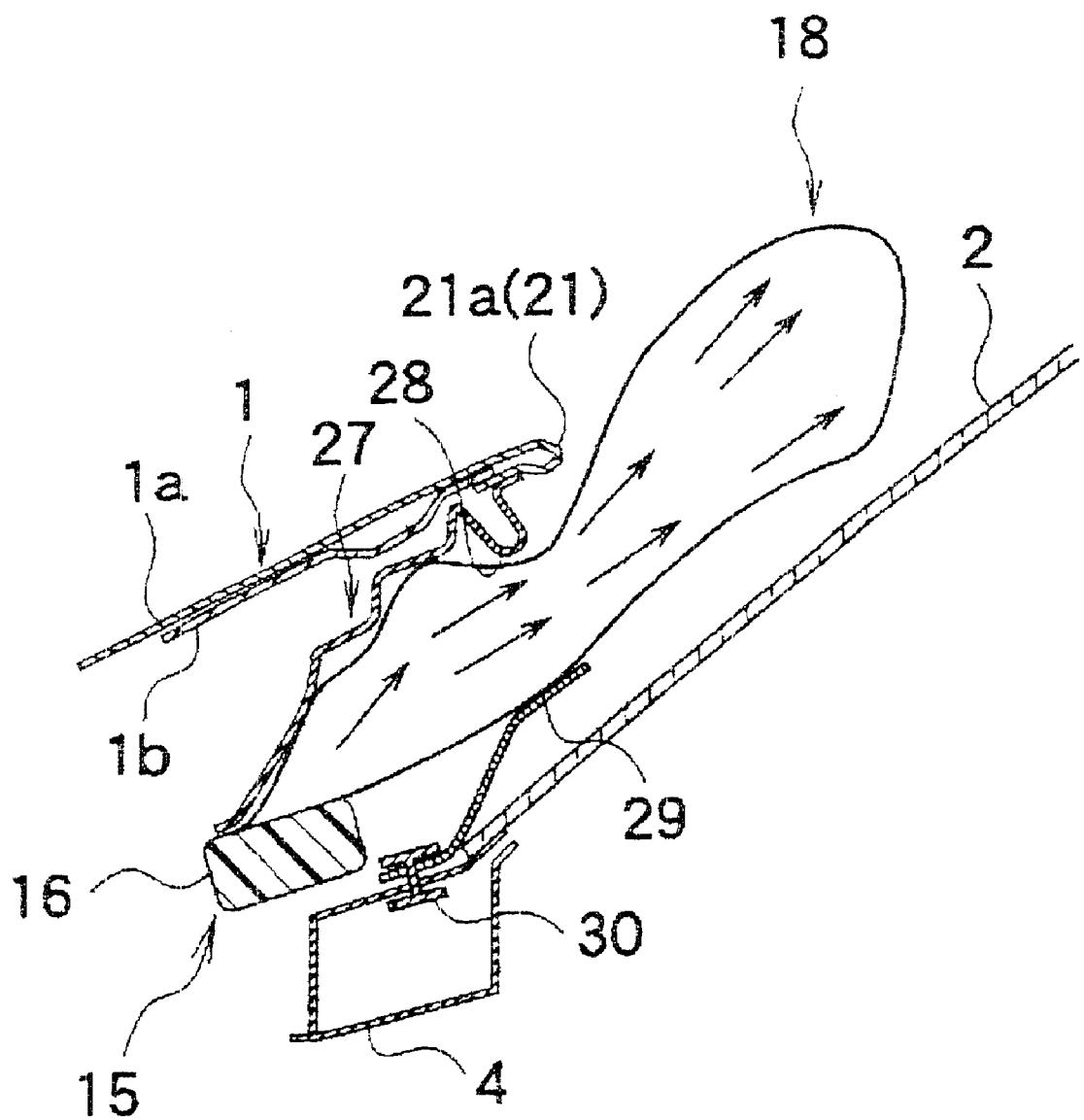
FIG. 16 is a partial cross sectional view illustrating the fifth embodiment of the present invention.

Referring now to FIG. 16, a vehicle air bag system in accordance with a fifth embodiment will now be explained. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity.

In this embodiment, a bottom guide member 29 that guides the unfolding of the bottom surface of the air bag 18 when the air bag inflates and unfolds is provided from the upper surface of the cowl top 4 to the bottom part of the front windshield 2. The bottom guide member 29 is made of plastic or a metal plate. Its bottom end is fixed to the cowl top 4 with a fastening member 30 and its upper end is forms a sloped surface that is disposed with a space between itself and the front windshield 2.

For convenience, this embodiment uses the connecting member 27 presented in the fourth embodiment as the upper guide 22 for preventing the air bag from arching up, but the invention is not limited to such a guide device.

Thus, the structure of the fifth embodiment adds to the effects of the first through fourth embodiments. When the air bag 18 expands from under the rear end part of the engine hood 1 in the initial stage of inflation and unfolding, the bottom surface of the air bag 18 is guided by the bottom guide member 29 and contact with the front windshield is avoided completely. As a result, the unfolding performance of the air bag 18 is improved even further.

The terms of degree such as "substantially", "about" and "approximately" as used herein mean a reasonable amount of deviation of the modified term such that the end result is not significantly changed.

This application claims priority to Japanese Patent Application No. 2000-227816. The entire disclosure of Japanese Patent Application No. 2000-227816 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air bag system comprising:
    a collision detection device that produces a detection signal upon detection of a collision between a front of a vehicle and an obstacle;
    a hood pop-up device that is arranged under a rear end part of an engine hood to move up the rear end part of the engine hood when actuated based on the detection signal from the collision detection device;
    a first air bag module that is arranged on a cowl top underneath a first rear lateral end of the rear end part of the engine hood, the air bag module comprising a first air bag located between the cowl top and the rear end part of the engine hood at the first rear lateral end of the rear end part of the engine hood, the first air bag being configured and arranged to inflate and expand out toward a front windshield from between the cowl top and the rear end part of the engine hood when the hood pop-up device is actuated, the first air bag being configured and arranged to cover a first region ranging from a base part to an upper end part of a front surface of a first front pillar; and
    a second air bag module that is arranged on a cowl top underneath a second rear lateral end of the rear end part of the engine hood, the air bag module comprising a second air bag located between the cowl top and the rear end part of the engine hood at the second rear lateral end of the rear end part of the engine hood, the second air bag being configured and arranged to inflate and expand out toward the front windshield from between the cowl top and the rear end part of the engine hood when the hood pop-up device is actuated, the second air bag being configured and arranged to cover a second region ranging from a base part to an upper end part of a front surface of a second front pillar.

2. A vehicle air bag system as recited in claim 1, further comprising
    a bottom guide extending from an upper surface of the cowl top to a lower part of the front windshield to guide a lower surface of the air bag when the air bag inflates.

3. A vehicle air bag system comprising:
    a collision detection device that produces a detection signal upon detection of a collision between a front of a vehicle and an obstacle;
    a hood pop-up device arranged under a rear end part of an engine hood to move up the rear end part of the engine hood when actuated based on the detection signal from the collision detection device; and
    an air bag module arranged on a cowl top underneath the rear end part of the engine hood, the air bag module having an air bag that is inflated to expand out toward a front windshield from between the cowl top and the rear end part of the engine hood when the hood pop-up device is actuated, the air bag being configured to cover a region ranging from a base part to an upper end part of a front surface of a front pillar,
    the rear end part of the engine hood is provided with a deformation prevention member that is configured and arranged in relation to the air bag module to prevent the rear end part from being deformed by the inflation of the air bag.

4. A vehicle air bag system as recited in claim 3, wherein the deformation prevention member comprises a circular folded edging part formed by expanding the rear end edge of an outer hood panel of the engine hood downward in a curved shape.

5. A vehicle air bag system comprising:
    a collision detection device that produces a detection signal upon detection of a collision between a front of a vehicle and an obstacle;
    a hood pop-up device arranged under a rear end part of an engine hood to move up the rear end part of the engine hood when actuated based on the detection signal from the collision detection device; and
    an air bag module arranged on a cowl top underneath the rear end part of the engine hood, the air bag module having an air bag that is inflated to expand out toward a front windshield from between the cowl top and the rear end part of the engine hood when the hood pop-up device is actuated, the air bag being configured to cover a region ranging from a base part to an upper end part of a front surface of a front pillar,
    the rear end part of the engine hood has an upper guide that is configured and arranged in relation to the air bag module to prevent the air bag from arching up when the air bag expands on a lower side of the rear end part of the engine hood.

6. A vehicle air bag system as recited in claim 5, wherein the upper guide includes a circular folded edging part, a protruding part and a recessed part, the circular folding edging part having a curved shape extending downwardly from the rear end edge of the engine hood, the protruding part being formed at the front side of the circular folded edging part so as to expand downward in a curved shape, and the recessed part being formed between the circular folded edging part and the protruding part.

7. A vehicle air bag system as recited in claim 5, wherein the upper guide is arranged to span between an upper surface of a module case and the rear end part of the engine hood, and to undergo elastic deformation such that it expands and contracts freely, the upper guide having a connecting member that has a downwardly projecting protruding part with a stepped shape in a longitudinal direction of the vehicle.

8. A vehicle air bag system comprising:
    a collision detection device that produces a detection signal upon detection of a collision between a front of a vehicle and an obstacle;
    a hood pop-up device arranged under a rear end part of an engine hood to move up the rear end part of the engine hood when actuated based on the detection signal from the collision detection device; and
    an air bag module arranged on a cowl top underneath the rear end part of the engine hood, the air bag module having an air bag that is inflated to expand out toward a front windshield from between the cowl top and the rear end part of the engine hood when the hood pop-up device is actuated, the air bag being configured to cover a region ranging from a base part to an upper end part of a front surface of a front pillar, the rear end part of the engine hood has a lateral guide on its lower side that is configured and arranged in relation to the air bag module to prevent the air bag from shifting sideways toward a lateral side of the vehicle when the air bag expands.

9. A vehicle air bag system as recited in claim 8, wherein the lateral guide comprises a circular folded edging part extending downwardly in a curved shape from on a lateral edge of the rear end of an outer hood panel of the engine hood, and a protruding part extending downwardly in a curved shape from a lateral part of a rear end part of an inner hood panel.

10. A vehicle air bag system comprising:

a collision detection device that produces a detection signal upon detection of a collision between a front of a vehicle and an obstacle;

a hood pop-up device arranged under a rear end part of an engine hood to move up the rear end part of the engine hood when actuated based on the detection signal from the collision detection device; and an air bag module arranged on a cowl top underneath the rear end part of the engine hood, the air bag module having an air bag that is inflated to expand out toward a front windshield from between the cowl top and the rear end part of the engine hood when the hood pop-up device is actuated, the air bag being configured to cover a region ranging from a base part to an upper end part of a front surface of a front pillar, a stopper disposed laterally outside of the air bag module with respect to a transverse direction of the vehicle to prevent the air bag from shifting sideways when the air bag inflates in a vertical direction of a front surface of the front pillar.

11. A vehicle air bag system as recited in claim 10, wherein the stopper comprises a stay of the hood pop-up device that extends upward when the rear end part of the engine hood is moved up.

12. A vehicle air bag system as recited in claim 10, wherein the air bag includes a substantially rectangular central part that inflates and unfolds long and at a slant from a module case toward the front pillar, and upper and lower sleeve parts extending from the central part in a continuous manner, each of the upper and lower sleeve parts having a substantially triangular shape with a base side forming a lateral side an upper section of the central part such that the upper and lower sleeve parts inflate to form a substantially rectangular shape that extends in the vertical direction and cover the front surface of the front pillar from the base part to the upper end part, the lower sleeve part being sized to wrap around the stopper when the air bag inflates.

13. A vehicle air bag system as recited in claim 11, wherein the stay of the hood pop-up device has a vertically oriented projection with undulation on an arc-shaped circumferential surface on a rear edge of the stay.

14. A vehicle air bag system as recited in claim 11, wherein the stay of the hood pop-up device is covered with a cylindrical cover having a flexible elastic member.

15. A vehicle air bag system as recited in claim 14, wherein the cover has a recessed part extending in a vertical direction which is formed at substantially a center portion of a rear lateral surface of the cover.

16. A vehicle air bag system comprising:

a collision detection device that produces a detection signal upon detection of a collision between a front of a vehicle and an obstacle;

a hood pop-up device arranged under a rear end part of an engine hood to move up the rear end part of the engine hood when actuated based on the detection signal from the collision detection device; and an air bag module arranged on a cowl top underneath the rear end part of the engine hood, the air bag module having an air bag that is inflated to expand out toward a front windshield from between the cowl top and the rear end part of the engine hood when the hood pop-up device is actuated, the air bag being configured to cover a region ranging from a base part to an upper end part of a front surface of a front pillar, the air bag including a substantially rectangular central part that inflates and unfolds long and at a slant from a module case toward the front pillar, and upper and lower sleeve parts extending from the central part in a continuous manner, each of the upper and lower sleeve parts having a substantially triangular shape with a base side forming a lateral side an upper section of the central part such that the upper and lower sleeve parts inflate to form a substantially rectangular shape that extends in the vertical direction and cover the front surface of the front pillar from the base part to the upper end part.

17. A vehicle air bag system as recited in claim 12, wherein the air bag is housed inside the module case by folding the upper and lower sleeve parts onto substantially the upper half of the central part such that at least the lower sleeve part is on a bottom side of the upper half of the central part, and folding the central part from its upper end so that the upper end is folded on top of an upwardly facing surface of an inner end of the central part.

18. A vehicle air bag system as recited in claim 16, wherein the air bag is housed inside the module case such that the upper and lower sleeve parts fold onto the upper half of the central part about the base sides, and the central part is folded up from its upper end so that the upper end is folded on top of an upwardly facing surface of an inner end of the central part.

19. A vehicle air bag system as recited in claim 18, wherein the upper and lower sleeve parts of the air bag fold onto the upwardly facing surface of the upper half of the central part.

20. A vehicle air bag system comprising:

collision detection means for detecting a collision between a front of a vehicle and an obstacle and for producing a detection signal upon detection upon detecting the collision;

hood pop-up means for moving up both sides of a rear end part of an engine hood when actuated based on the detection signal from the collision detection means; and air bag means for covering forwardly facing regions of front pillars, when the hood pop-up means is actuated, the air bag means being arranged on a cowl top underneath both sides of the rear end part of the engine hood to inflate towards a front windshield from between the cowl top and the rear end part of the engine hood.

21. A vehicle air bag system comprising:

a collision detection device that produces a detection signal upon detection of a collision between a front of a vehicle and an obstacle;

a hood pop-up device arranged under a rear end part of an engine hood to move up the rear end part of the engine hood when actuated based on the detection signal from the collision detection device;

a first air bag module arranged on a cowl top underneath a first lateral end part of the rear end part of the engine hood, the first air bag module having a first air bag that is inflated to expand out toward a front windshield from between the cowl top and the rear end part of the engine hood when the hood pop-up device is actuated, the first air bag being configured to cover a first region ranging from a base part to an upper end part of a front surface of a first front pillar; and a first lateral positioning member configured and arranged laterally in relation to the first air bag module to support a first lower end of the first air bag when the first air bag expands along the front surface of the first front pillar.

22. A vehicle air bag system as recited in claim 21, further comprising a second air bag module arranged on a cowl top underneath a second lateral end part of the rear end part of the engine hood, the second air bag module having a second air bag that is inflated to expand out toward a front windshield from between the cowl top and the rear end part of the engine hood when the hood pop-up device is actuated, the second air bag being configured to cover a second region ranging from a base part to an upper end part of a front surface of a second front pillar; and a second lateral positioning member configured and arranged laterally in relation to the second air bag module to support a second lower end of the second air bag when the second air bag expands along the front surface of the second front pillar.

23. A vehicle air bag system as recited in claim 21, wherein the first air bag includes a substantially rectangular portion with the first lower end supported by the first lateral positioning member when the first air bag expands along the front surface of the first front pillar; and the second air bag includes a substantially rectangular portion with the second lower end supported by the second lateral positioning member when the second air bag expands along the front surface of the second front pillar.

24. A vehicle air bag system as recited in claim 21, wherein the first lateral positioning member supports the first air bag along an area of the vehicle between the base part of the front surface of the first front pillar and a first lateral end of the cowl top; and the second lateral positioning member supports the second air bag along an area of the vehicle between the base part of the front surface of the second front pillar and a second lateral end of the cowl top.

25. A vehicle air bag system as recited in claim 21, wherein the first air bag includes a substantially rectangular portion with the lower end supported by the first lateral positioning member when the first air bag expands along the front surface of the first front pillar.

26. A vehicle air bag system as recited in claim 21, wherein the first lateral positioning member supports the first air bag along an area of the vehicle between the base part of the front surface of the first front pillar and a first lateral end of the cowl top.

* * * * *